United States Patent [19]

Hirayama et al.

[11] 4,450,571

[45] May 22, 1984

[54] TWO-WAY SIGNAL TRANSMISSION AND ONE-WAY DC POWER SUPPLY USING A SINGLE LINE PAIR

[75] Inventors: Takashi Hirayama, Tachikawa; Yuichi Igarashi, Sukagawa, both of Japan

[73] Assignee: Iwasaki Tsushinki Kabushiki Kaisha, Tokyo, Japan

[21] Appl. No.: 256,598

[22] Filed: Apr. 22, 1981

[30] Foreign Application Priority Data

Apr. 22, 1980 [JP] Japan .................................. 55-52316

[51] Int. Cl.³ .............................................. H04L 5/14
[52] U.S. Cl. ........................................... 375/7; 375/36; 370/24
[58] Field of Search ................. 375/3, 7, 8, 36, 98; 370/24, 31, 41, 85, 86, 32; 455/58, 68, 70; 179/170.2, 170 NL; 340/825.5

[56] References Cited

U.S. PATENT DOCUMENTS

| | | | |
|---|---|---|---|
| 3,540,049 | 11/1970 | Gaunt, Jr. .............................. | 370/32 |
| 3,786,418 | 1/1974 | Nick ....................................... | 375/36 |
| 3,843,834 | 11/1974 | Burke ..................................... | 370/31 |
| 3,967,058 | 6/1976 | Moriya et al. ........................ | 370/29 |
| 3,983,482 | 9/1976 | Doherty ................................. | 375/3 |
| 4,086,534 | 4/1978 | Olson ..................................... | 375/36 |
| 4,106,104 | 8/1978 | Nitta et al. ......................... | 340/825.5 |
| 4,317,205 | 2/1982 | Lam ........................................ | 375/7 |
| 4,328,586 | 5/1982 | Hansen ................................. | 370/32 |

*Primary Examiner*—Robert L. Griffin
*Assistant Examiner*—Stephen Chin
*Attorney, Agent, or Firm*—Robert E. Burns; Emmanuel J. Lobato; Bruce L. Adams

[57] ABSTRACT

A signal transmission system which perform two-way signal transmission between a first transmitter-receiver and a second transmitter-receiver via a pair of signal lines and supplies a DC current from the first transmitter-receiver to the second transmitter-receiver. In each of the first transmitter-receiver and the second transmitter-receiver, there are provided a current varying circuit for varying a signal line current by a transmission pulse signal so that the signal line current may assume a value in a predetermined current region lower than a minimum level of a load current to the other transmitter-receiver during sending out a signal pulse, a current detector for detecting a current or voltage variation in the signal line current, and a gate circuit for blocking the detected output from the current detector while the transmission pulse is sending out to the current varying circuit.

2 Claims, 10 Drawing Figures

1ST TRANSMITTER-RECEIVER

2ND TRANSMITTER-RECEIVER

TWO-WAY SIGNAL TRANSMISSION AND ONE-WAY DC POWER SUPPLY USING A SINGLE LINE PAIR

BACKGROUND OF THE INVENTION

The present invention relates to a signal transmission system which performs DC power supply and signal transmission and reception through the use of a pair of signal lines.

In conventional systems of this kind in which signals are transmitted in two directions between first and second equipments via a pair of signal lines and a DC current is supplied from the first equipment to the second one, a constant-current circuit must be provided in the second equipment in order for the first equipment to make distinction between a load fluctuation current and a signal current of the second equipment. A fixed load current and a signal current flow in the pair of signal lines, and a change in the signal current is detected as a signal by a current detector of the first equipment; accordingly, the constant-current circuit is required to be capable of consuming power that a difference in the load fluctuation current of the second equipment is multiplied by the DC input voltage of the second equipment, and this leads to a considerable power loss, resulting in inefficient DC supply.

BRIEF SUMMARY OF THE INVENTION

An object of the present invention is to provide a signal transmission system which permits signal transmission between two equipments of simple circuit arrangements via a pair of signal lines and highly efficient DC supply from one of the two equipments to the other, thereby to reduce the manufacturing costs and decrease the number of pairs of lines in a cable used.

To attain the above object of the invention, there is provided a signal transmission system which performs two-way signal transmission between a first transmitter-receiver and a second transmitter-receiver interconnected via a pair of signal lines and supplies a DC current from the first transmitter-receiver to the second transmitter-receiver. The first transmitter-receiver is provided with a first current varying circuit for varying a signal line current by a first transmission pulse signal so that the signal line current may assume a value in a predetermined current region lower than a minimum level of a load current to the second transmitter-receiver during sending out a signal pulse from the first transmitter-receiver.

The second transmitter-receiver is provided with a second detector for detecting a current or voltage variation in the signal line current, a second current varying circuit for varying the signal line current by a second transmission pulse signal so that the signal line current may assume a value in the predetermined current region during sending out the signal pulse, and a second gate circuit for blocking the detected output from the second detector while the second transmission pulse signal is sent out by the second current varying circuit. The first transmitter-receiver is further provided with a first current detector for detecting a current variation in the signal line current by the second transmission pulse, and a first gate circuit for blocking the detected output from the first current detector while the first transmission pulse signal is sent out.

BRIEF DESCRIPTION OF THE DRAWINGS

The invention will be described in detail below with reference to the accompanying drawings, in which.

DETAILED DESCRIPTION

Figure 1:
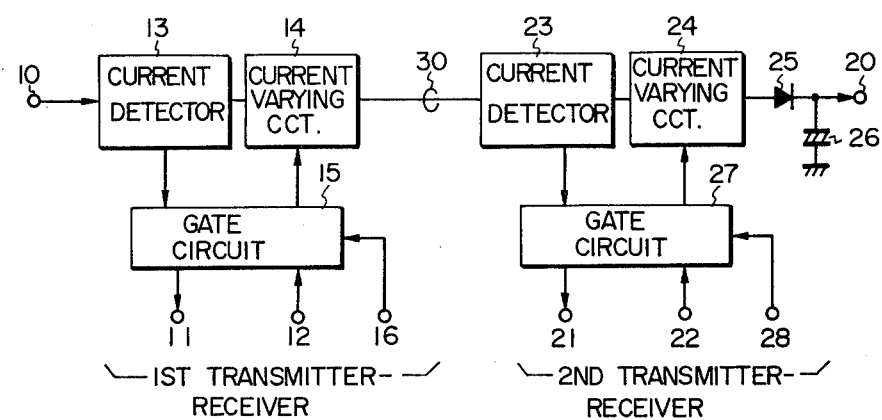
FIGS. 1 and 2 are block diagrams showing the principle of the signal transmission system of the present invention.

With reference to FIG. 1, a first operational principle will first be described. In a first transmitter-receiver, reference numeral 10 indicates a power source input terminal; 11 designates a signal output terminal; 12 identifies a signal input terminal; 13 denotes a first current detector; 14 represents a first current varying circuit; 15 shows a gate circuit; and 16 refers to a first gate input terminal. In a second transmitter-receiver, reference numeral 20 indicates a power source output terminal; 21 designates a signal output terminal; 22 identifies a signal input terminal; 23 denotes a second current detector; 24 represents a second current varying circuit; 25 shows a diode; 26 refers to a capacitor; 27 indicates a second gate circuit; and 28 designates a gate input terminal. The first and second transmitter-receivers are interconnected via a pair of signal lines 30 indicated by a single line.

Figure 3:
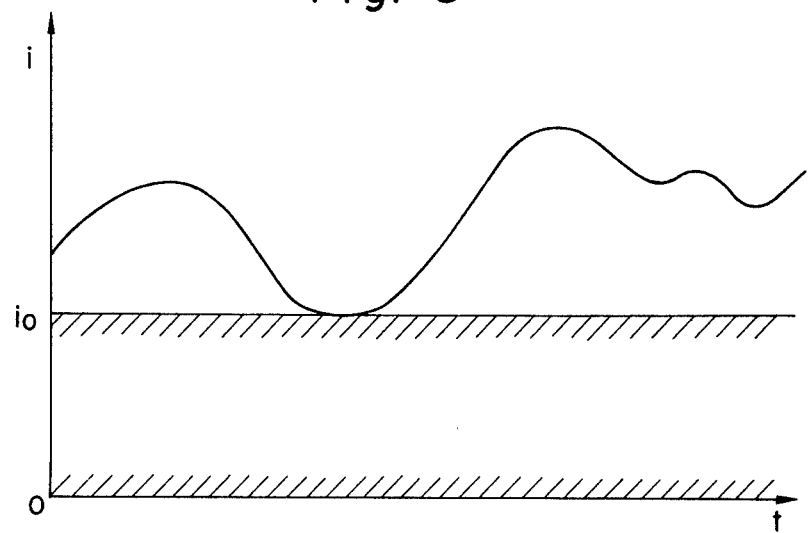
FIG. 3 is a waveform diagram explanatory of the principle of the signal transmission according to the present invention.

FIG. 3 is a diagram showing the principle of signal transmission according to the present invention. Reference character i indicates a load current available from the power source output terminal 20; t designates time; and $i_0$ identifies a minimum level of the load current i. Let it be assumed that a predetermined, hatched current region lower than the minimum level $i_0$ is handled as a signal.

Figure 4:
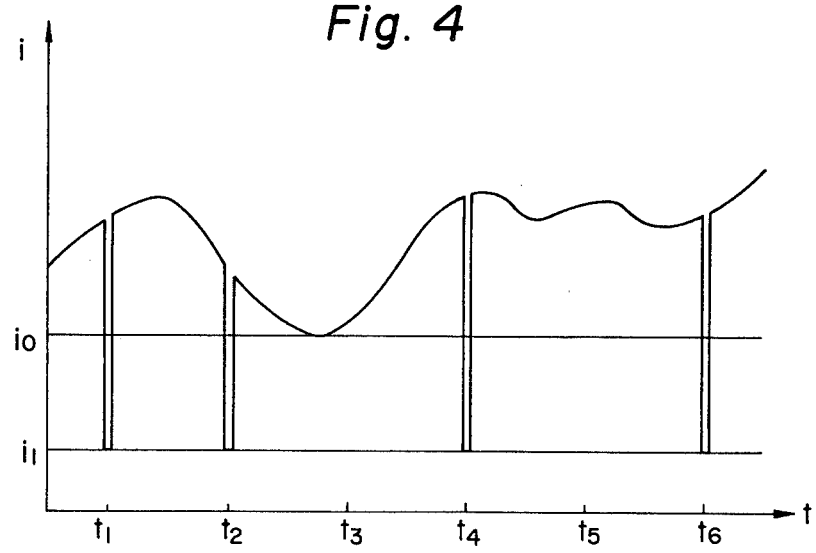
FIG. 4 is a waveform diagram explanatory of the operation for the signal transmission according to the present invention.

FIG. 4 shows an operating waveform for the signal transmission. Reference character i indicates a current flowing in the pair of signal lines 30 and t designates time. Assuming that, from $t_1$ to $t_6$, pulses are sent out at regular intervals if the signal is to be transmitted at the time slot, it is possible to take out the signal by detecting its presence or absence on the basis whether or not the current varies down to $i_1$ in a current region below the level $i_0$.

In FIG. 1, the gate circuit 15 is switched between transmission and reception modes by making the gate input terminal 16 a high-level and a low-level, respectively. In a case of transmitting a signal from the first transmitter-receiver to the second one, the gate input terminals 16 and 28 are usually rendered the high-level and the low level respectively, thereby establishing the current varying circuits 14 and 24 in the states in which they permit the passage therethrough of a current. When a signal is applied to the signal input terminal 12, the current varying circuit 14 is transferred to a state in which no current flows therethrough so that this current variation can be detected as a signal by the current detector 23. At that time, the power source output terminal 20 is disconnected from the current varying circuit 24 by the diode 25 but, by the capacitor 26, the power source output terminal 20 can be held at a certain voltage.

Next, in a case of transmitting a signal from the second transmitter receiver to the first one, the current varying circuits 14 and 24 are made to permit the passage of currents by rendering the gate input terminals 28 and 16 the high-level and the low-level respectively, as is the case with the above. Upon application of a signal to the signal input terminal 22, the current varying circuit 24 is rendered into a state in which it does not flow therethrough the current so that this current variation can be detected as a signal by the current detector 13. In this case, by the capacitor 26, the power source output terminal 20 can be retained at a certain voltage, permitting the signal transmission and the DC supply in the two directions.

Figure 2:
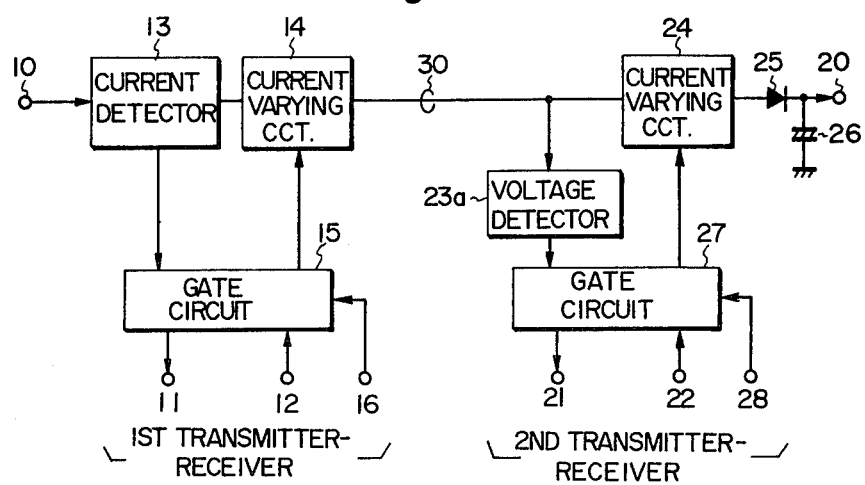

In FIG. 2, the current detector 23 used in FIG. 1 is substituted by a voltage detector 23a to eliminate a voltage drop for the current detection, and the illustrated circuit is identical in other arrangements and in operation with the circuit of FIG. 1.

Figure 5A:
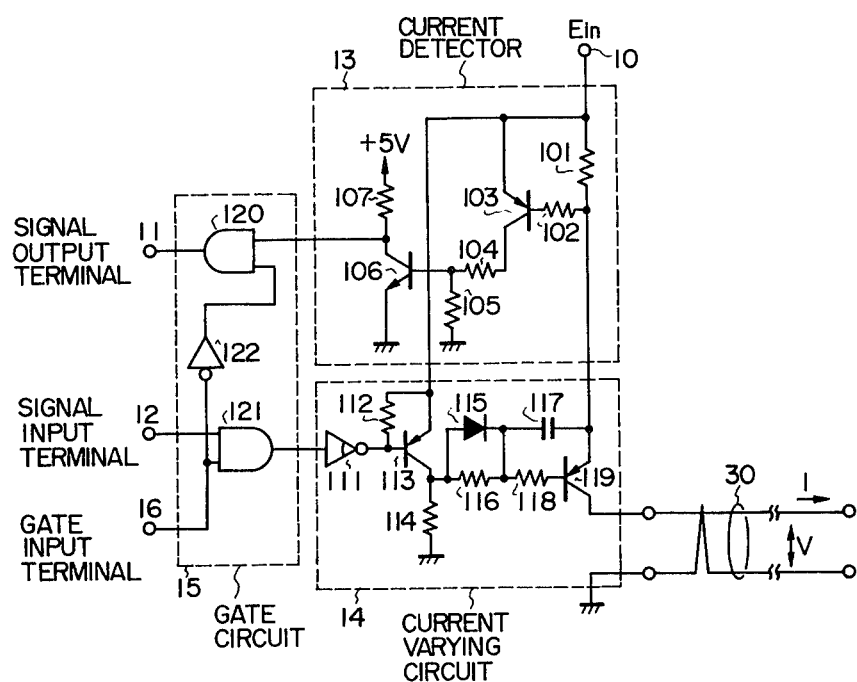
FIGS. 5A and 5B show a circuit diagram illustrating an embodiment of the present invention.
Figure 5B:
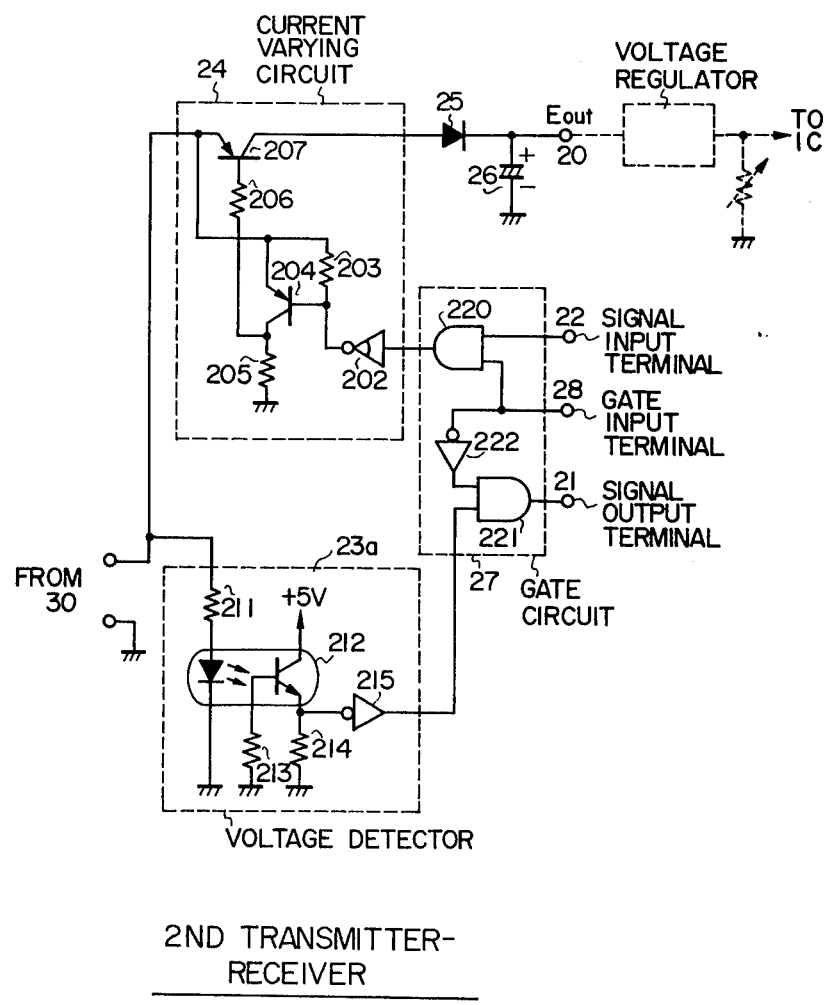

FIGS. 5A and 5B illustrates an embodiment of the signal transmission system of the present invention employing the operational principle described in connection with FIG. 2. In the first transmitter-receiver shown in FIG. 5A, reference numeral 10 indicates a power source input terminal; 11 designates a signal output terminal; 12 identifies a signal input terminal; 13 denotes a current detector; 14 represents a current varying circuit; 15 shows a gate circuit; and 16 refers to a gate input terminal. In the second transmitter-receiver shown in FIG. 5B, reference numeral 20 indicates a power source output terminal, which is connected via a voltage regulator to a load; 21 designates a signal output terminal; 22 identifies a signal input terminal; 23a denotes a voltage detector; 24 represents a current varying circuit; 25 shows a diode; 26 refers to a capacitor; 27 indicates a gate circuit (usually in the reception mode when held at the low-level); and 28 designates a gate input.

For activating them, the gate input terminal 16 and the signal input terminal 12 are made the low-level and a source power is applied from the power source input terminal 10. The source power is supplied to the signal lines 30 via a resistor 101 and a transistor 119 of the ON state. Since the gate input terminal 28 is held at the low-level, a transistor 207 is in the ON state so that the signal lines 30 are connected to a load via the transistor 207, the diode 25, the capacitor 26, the power source output terminal 20 and the voltage regulator.

In a case of transmitting a signal from the first transmitter-receiver to the second one in such a state as mentioned above, the gate input terminal 16 is held at the high-level to switch the first transmitter-receiver to the transmission mode and positive pulses are applied to the signal input terminal 12. In this case, the transistor 119 is turned-OFF via an AND gate 121 of the gate circuit 15, an open-collector inverter 111 of the current varying circuit 14, a pull-up resistor 112, a transistor 113, a collector resistor 114, a diode 116 and a base resistor 118, inhibiting the passage of a current through the transistor 119. As a result of this, a voltage drop occurs across the signal lines 30 to cut off the diode 25, resulting in no load current flowing. the voltage detector 23a of the second transmitter-receiver connected across the signal lines 30 becomes a state where no current flows in a resistor 211 and a diode of a photo coupler 212 so that high-level pulses are obtained at the output side of an inverter 215 via a speed-up resistor 213 and an emitter resistor 214 of the photo coupler 212. The resistor 114, the diode 116 and a capacitor 117 of the current varying circuit 14 of the first transmitter-receiver are used to delay only the rise of the current in the signal lines 30, preventing noise generation in other signal lines. The capacitor 26 is provided for maintaining a certain voltage across the load when the diode 25 is held at the OFF state.

In a case of the signal transmission from the second transmitter-receiver to the first one, the gate input terminal 28 is held at the high-level to switch the second transmitter-receiver to the transmission mode and, at the same time, the gate input terminal 16 of the first transmitter-receiver is held at the low-level to alter it to the reception mode, in which an AND gate 120 is opened and the transistor 119 assumes the ON state. Applying positive pulses to the signal input terminal 22 to the current varying circuit 24 of the second transmitter-receiver, the transistor 207 is turned-ON via an AND gate 220, an open-collector inverter 202, a pull-up resistor 203, a transistor 204, a collector resistor 205 and a base resistor 206, preventing the flow of the load current. This current variation is detected as a voltage drop (about 1 volt) across the resistor 101 of the current detector 13 of the first transmitter-receiver by a base resistor 102 and a transistor 103, so that positive pulses are generated at the signal output terminal 11 via a collector resistor 104, a base resistor 105, a transistor 106, a collector resistor 107 and the AND gate 120. When the transistor 207 is held at the OFF state, charges stored in the capacitor 26 are discharged, by which the voltage across the load is held at a certain voltage.

As described above, the signal transmission is possible between the first and second transmitter-receivers, and since the transistors all perform the switching operations, no appreciable heat is generated and the DC supply can be achieved at the high efficiency. The larger the ratio of the period to the pulse width of the signal to be transmitted is, the more efficiently the DC supply is performed.

Figure 6A:
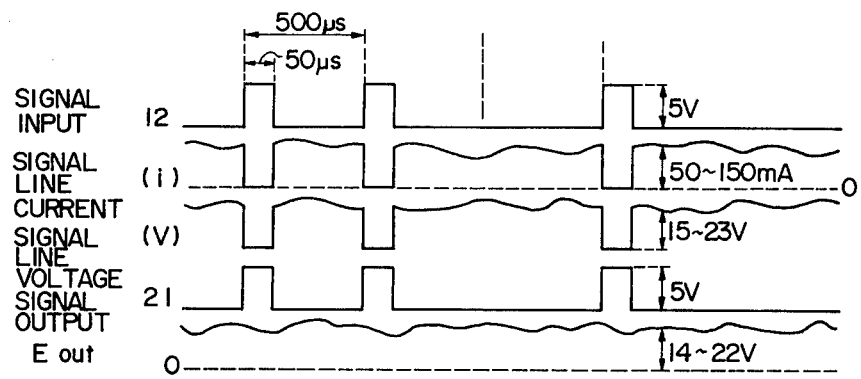
FIGS. 6A and 6B are waveform diagrams explanatory of the operation of the embodiment shown in FIGS. 5A and 5B.
Figure 6B:
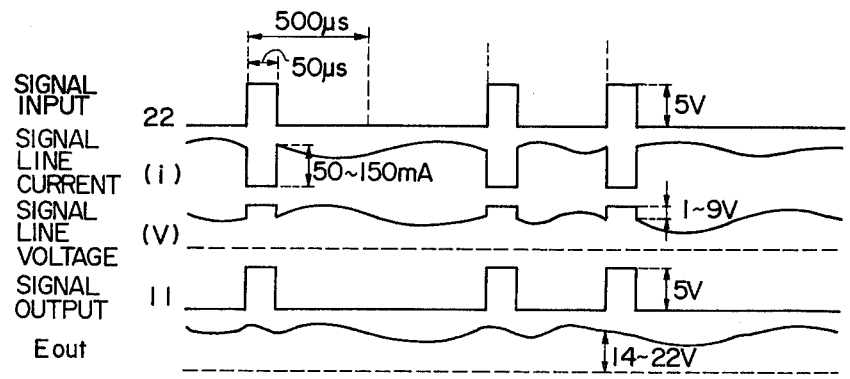

FIGS. 6A and 6B show signal waveforms transmitted in the embodiment of FIG. 5, FIG. 6A showing the signal waveform transmitted from the first transmitter-receiver to the second one. In FIG. 5, the signal input 12 is held at the low-level at first and, when a positive pulse is applied to the signal input, a signal line current i of the signal line 30 (the line resistance of which is desired to be lower than 40 Ω) undergoes a current variation of a negative pulse in case of a load current change of 50 to 150 mA. As a result of this, a signal line voltage V undergoes a variation of a negative pulse so that a voltage waveform of a positive pulse is generated at the signal output terminal 21 from the voltage detector 23a. A voltage $E_{out}$ at the power source output terminal 20 is attenuated at a time constant corresponding to the load resistance ($=E_{out}$/load current)×the capacitance of the capacitor 26 upon each application of the signal.

FIG. 6B shows waveforms of signals which are transmitted from the second transmitter-receiver to the first one. The signal input 22 is held at the low-level at first and when a positive pulse is applied thereto, a current variation of a negative pulse occurs in the signal line current i. Since the resistor 101 is connected in series to the signal line 30, the signal line voltage V is generated as shown and a positive pulse is provided at the signal output terminal 11 at the output side of the current detector 13. The voltage $E_{out}$ at the power source output terminal 20 is the same as mentioned above.

Figure 7A:
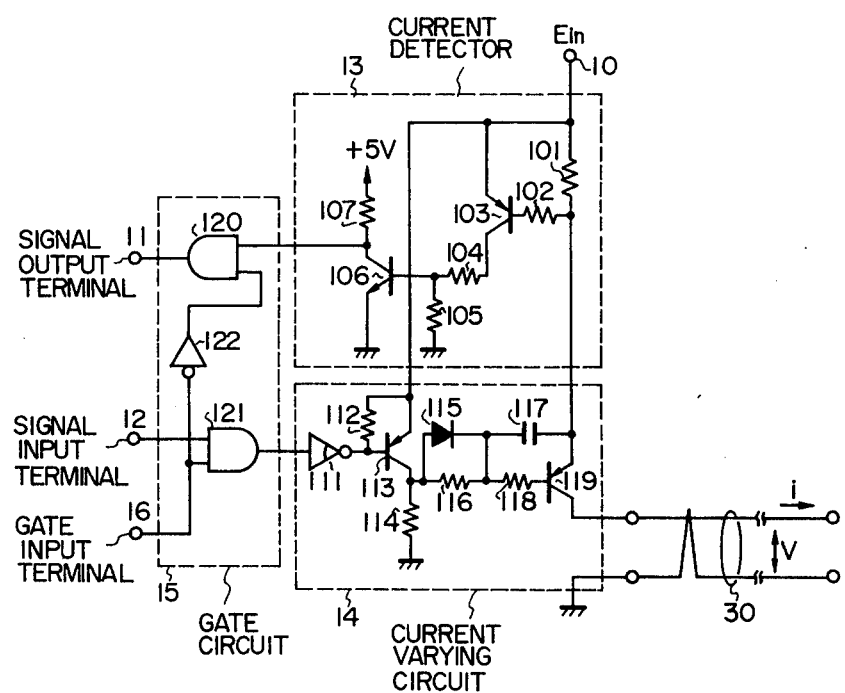
FIGS. 7A and 7B show a circuit diagram showing another embodiment of the present invention.
Figure 7B:
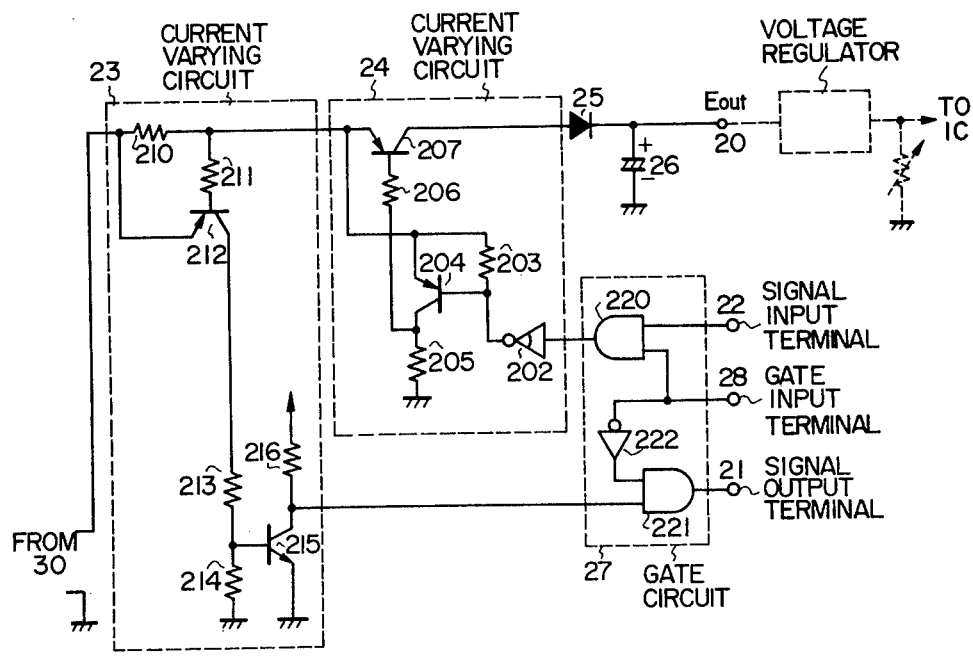

FIGS. 7A and 7B illustrate another embodiment of the signal transmission system of the present invention employing the operational principle described previously with respect to FIG. 1. This embodiment differs from the embodiment of FIGS. 5A and 5B in the provision of the current detector 23, which comprises transistors 212 and 215 and resistors 210, 211, 213, 214 and 216. That is, the resistor 210 is connected in series to the signal line 30 and, in the signal transmission from the first transmitter-receiver to the second one, a current variation in the signal line 30 is detected as a drop (about 1 volt) across the resistor 210 by the base resistor 211 and the transistor 212, and positive pulses are provided at the signal output terminal 21 via the collector resistor 213, the base resistor 214, the transistor 215, the collector resistor 216 and an AND gate 221. The other operations of this embodiment are similar to those of the embodiment of FIGS. 5A and 5B.

As has been described in the foregoing, the present invention permits the signal transmission and reception between two equipments through the use of a pair of signal lines and enables the DC supply from the one equipment to the other; therefore, the present invention contributes to the reduction of the number of pairs of lines of a cable used and is of great utility from the economical point of view. The present invention is applicable, for example, to a key telephone system and terminal I/O equipments of computers.

What we claim is:

1. A pulse signal transmission system for performing two-way signal transmission between a first transmitter-receiver and a second transmitter-receiver interconnected via a pair of signal lines and supplies a DC current from the first transmitter-receiver to the second one through said pair of signal lines, characterized in that the first transmitter-receiver comprises a first current varying a signal line current in response to a first transmission pulse signal and means effective for varying the signal line current so that the signal line current has a value in a predetermined current region lower than a minimum level of a load current to the second transmitter-receiver during transmission of a signal pulse from the first transmitter-receiver; the second transmitter-receiver having a second detector for detecting a current or voltage variation in the signal line current, a second current varying circuit for varying the signal line current in response to a second transmission pulse signal and means effective for varying the signal line current so that it has a value in the predetermined current region during transmission of the signal pulse, a gate circuit for blocking the detected output from the second detector while the second transmission pulse signal is transmitted by the second current varying circuit; and the first transmitter-receiver having a first current detector for detecting a current variation in the signal line current in response to the second transmission pulse, and another gate circuit for blocking the detected output from the first current detector while the first transmission pulse signal is transmitted.

2. A pulse signal transmission system for two-way signal transmission over a signal and DC supply line pair, comprising:
   first current varying means for varying a signal line direct current in response to a pulse signal to be transmitted and means for effecting signal line direct current value decreases to a level below a certain minimum value during transmission of the pulse signal;
   detecting means for detecting signal line current or voltage variations developed by said first current varying means having means and for developing an output signal in response thereto;
   second current varying means for varying the signal line direct current in response to a second pulse signal to be transmitted and means for effecting signal line direct current value decreases below the certain minimum value during the transmission of the second pulse signal;
   signal gating means for blocking the detecting means output signal developed in response to signal line current or voltage variations developed by said first current varying means while the second pulse signal is transmitted;
   detecting means for detecting signal line current or voltage variations developed by said second current varying means and for developing an output signal in response thereto; and
   signal gating means for blocking the detecting means output signal developed in response to signal line current or voltage variations developed by said second current varying means while the second pulse signal is transmitted.

* * * * *